United States Patent [19]

Speer et al.

[11] Patent Number: 5,389,402
[45] Date of Patent: Feb. 14, 1995

[54] METHOD OF PRODUCING DECORATIONS WHICH ARE COLOR-STABLE IN A PORCELAIN FIRING AND A PIGMENT COMPOSITION SUITABLE THEREFOR

[75] Inventors: Dietrich Speer; Akos Kiss; Jenny Horst, all of Hanau; Güenter Halbritter, Rodenbach; Rita Loew, Rodgau, all of Germany

[73] Assignee: Degussa Aktiengesellschaft, Frankfurt, Germany

[21] Appl. No.: 59,582

[22] Filed: May 12, 1993

[30] Foreign Application Priority Data

May 15, 1992 [DE] Germany .............................. 4216175

[51] Int. Cl.⁶ .................... B05D 5/00; C09C 1/04; C08K 3/00
[52] U.S. Cl. ........................ 427/258; 106/427; 106/429; 106/431; 106/450; 106/452; 106/481; 427/226; 427/287; 427/376.2; 427/379; 427/419.1; 427/261
[58] Field of Search ............ 427/226, 287, 258, 419.6, 427/376.2, 419.1, 379, 261; 106/427, 431, 429, 450, 452, 481

[56] References Cited

U.S. PATENT DOCUMENTS

| | | | |
|---|---|---|---|
| 3,802,900 | 4/1974 | Broll et al. | 106/288 B |
| 3,847,639 | 11/1974 | Broll et al. | 106/288 B |
| 4,216,023 | 8/1980 | Kinstle | 106/293 |
| 4,394,064 | 7/1983 | Dauson | 350/259 |
| 4,769,310 | 9/1988 | Gugger et al. | 430/346 |
| 4,874,433 | 10/1989 | Kiss et al. | 106/450 |

FOREIGN PATENT DOCUMENTS

| | | |
|---|---|---|
| 246012 | 3/1966 | Austria . |
| 2312535 | 11/1973 | Germany . |
| 2315611 | 11/1973 | Germany . |

OTHER PUBLICATIONS

Teuchert, K., et al., "On the process of glaze formation and a source of certain feldspathic porcelain glaze defects", cfi/Ber. DKG Feb. 1982, pp. 142–148, cited on p. 4 of the application.

Kerstan, W., "Die rohstoffe zur herstellung farbiger glasuren und keramischer farbkoerper", Sprechsaal (1990), vol. 123, pp. 1190–1201 with English language translations of what appears to be the most relevant portions.

*Primary Examiner*—Janyce Bell
*Attorney, Agent, or Firm*—Beveridge, DeGrandi, Weilacher & Young

[57] ABSTRACT

A method for producing decorations which are color-stable in a porcelain firing (glost firing), and a pigment composition suitable for this method, is disclosed. Inclusion pigments based on heavy-metal sulfides and selenides in an oxidic or silicate casing, especially $ZrSiO_4$, result in more color-stable decorations in a porcelain firing if color-stabilizing auxiliary agents from the series of Zn compounds, especially ZnO or zinc-containing glass frits, or cerium(III) or cerium(IV) compounds, especially $CeO_2$, are used in the decorative layer and/or glaze layer as color-stabilizing auxiliary agents. The amount used in the decorative layer is generally 5 to 50% by weight in the case of ZnO and $CeO_2$, relative to the inclusion pigment. The pigment composition contains at least one of the color-stabilizing auxiliary agents in addition to an inclusion pigment.

31 Claims, No Drawings

METHOD OF PRODUCING DECORATIONS WHICH ARE COLOR-STABLE IN A PORCELAIN FIRING AND A PIGMENT COMPOSITION SUITABLE THEREFOR

BACKGROUND AND INTRODUCTION

The present invention relates to a method for producing decorations which are essentially color-stable in a porcelain firing (glost firing), that is, decorations which endure the thermal stress of the porcelain firing without significant color changes after the application of the decoration onto unfired porcelain and the application of a glaze onto the decorated surface. The decorations contain inclusion pigments based on crystals enclosed in a transparent oxidic or silicate casing and which consists of colored heavy-metal sulfides, selenides or sulfoselenides, especially zirconium inclusion pigments containing cadmium sulfide or cadmium sulfoselenide. Further subject matter of the present invention relates to a pigment composition suitable for carrying out this method which contains at least one color-stabilizing auxiliary agent in addition to one of the cited inclusion pigments.

Various methods are known for the production of colored decorations on porcelain. Thus, glost-fired, glazed porcelain can be subsequently decorated using ceramic coloring bodies by applying a decorative layer by means of customary decorative methods and firing on the obtained decoration in a so-called decoration firing. Another method for producing decorations on porcelain involves porcelain which is pre-fired in a so-called biscuit firing at approximately 1000° C., and is pre-strengthened or hardened in this manner, and which is converted after application of a colored decoration and a porcelain glaze during the subsequent actual porcelain firing at 1200° to 1500° C. (usually designated as a glost firing or final firing) into the actual glazed and decorated porcelain. Soft porcelains can be provided with a colored decoration more easily than hard porcelains since a greater number of ceramic coloring bodies endure the lower firing temperature (1200° to approximately 1350° C. possible in the case of soft porcelain) without decomposition or appreciable color change. Under the extreme temperature stress of porcelain firing for hard porcelain in particular (i.e., several hours in a range of approximately 1350° C. to approximately 1500° C.), most traditional coloring bodies, including inclusion pigments, are no longer color-stable or no longer sufficiently color stable. In such instances the decorative possibilities are limited.

Attempts have been made in recent porcelain finishing methods to produce a glazed porcelain provided with a colored decoration in such a manner that only a single firing procedure, a so-called single rapid firing, is necessary. The firing temperatures are usually around 1400° C. As has already been explained above, the limited palette of available color-stable pigments is also noticeable here in a negative fashion. There is a report about the production of porcelain according to this new technique in "Keramische Zeitschrift" 43, No. 7 (1991), pp. 473–477. Suggestions about glazing errors occurring in this technique and possibilities of eliminating them (e.g., an oxidizing firing atmosphere at 1280° C. before the melting fire) can be gathered from cfi/Ber. DKG 2/82, pp. 142–148.

Even the inclusion pigments based on crystals of colored heavy-metal sulfides, selenides or sulfoselenides enclosed in a transparent oxidic or silicate casing, which pigments are known to be especially temperature-stable and glaze-stable, prove to be insufficiently color-stable under the conditions of a porcelain firing at 1350° to 1500° C. For example, gray and/or brown discolorations appear in zirconium-cadmium sulfide yellow and zirconium-cadmium sulfoselenide red. It is theorized that under the conditions of a porcelain firing the chromophores cadmium sulfide and cadmium sulfoselenide partially exit from the casing surrounding them and separate colloidally in the glaze in this form or in combination with glaze components.

The present invention sought to solve the problem of developing a method for the production of decorations which are sufficiently color-stable in a porcelain firing (glost firing) without having to develop basically new pigments. There was particular interest in making available inclusion pigments with sulfidic and/or selenidic inclusions ranging in color from bright yellow to red, like those known from DE-OS 23 12 535 and commercially available, for the decoration of porcelain before the actual porcelain firing. Finally, a further problem sought to be solved concerns making available a pigment composition containing a color-stabilizing auxiliary agent in addition to the cited inclusion pigments so that the pigment composition can be readily used for the production of decorations which are color-stable in a porcelain firing.

SUMMARY OF THE INVENTION

A method is disclosed for the production of decorations which are essentially color-stable in a porcelain firing (glost firing) comprising the steps applying a decorative layer and a layer of glaze onto porcelain which is unfired, or pre-fired in a biscuit firing, and the step of firing the porcelain at a temperature in a range of 1300° to 1500° C. which is characterized in that inclusion pigments based on crystals of colored heavy-metal sulfides, selenides or sulfoselenides enclosed in a transparent oxidic or silicate casing are used in the decorative layer and at least one color-stabilizing auxiliary agent is used in the decorative layer and/or in the layer of glaze. The color-stabilizing auxiliary agent is selected from the group consisting of cerium(III) or cerium (IV) compounds, zinc oxide and other zinc compounds forming zinc ions during the porcelain firing in an amount of at least 2% by weight calculated as ZnO or $Ce_2O_3$ or $CeO_2$ and relative to the amount of inorganic solids in the decorative layer or layer of glaze.

DETAILED DESCRIPTION OF THE INVENTION

It has been surprisingly found that zinc oxide as well as other zinc compounds which form zinc ions during the porcelain firing, as well as cerium(III) or cerium-(IV) compounds, exert the desired color-stabilizing action for producing decorations on porcelain. Due to the chemical variation of the color-stabilizing auxiliary agents, it is theorized that different mechanisms of action become effective in the color stabilization. An especially good color stabilization is achieved if the color-stabilizing auxiliary agents are present in an effective amount in the spatial vicinity of the pigment particles. This is the case in particular if the color-stabilizing auxiliary agents are used in the decorative layer. Without being bound by theory, the color-altering components exiting during the porcelain firing from the inclusion pigments are oxidized by the cerium(IV) compounds to colorless substances or are caught by the zinc ions resulting from zinc oxide or other zinc compounds in the form of colorless compounds. The reactions responsible for the color stabilization take place in the range of the surrounding glaze in the molten state. The zinc of the zinc compounds acting in a color-stabilizing manner is present in such melts in ionic form.

The inclusion pigments to be used in accordance with the invention have long been known (see DE-OS 23 12 535; U.S. Pat. Nos. 3,847,639 and 4,874,433 (which are incorporated by reference in their entirety)). The oxidic or silicate casing typically involves substances from the series $ZrO_2$, $SnO_2$, $Al_2O_3$ and $ZrSiO_4$. Inclusion pigments based on zirconium silicate (zirconium) or tin dioxide are preferred; zirconium inclusion pigments, which are also commercially available, are specially preferred. Among the colored heavy-metal sulfides, selenides or sulfoselenides enclosed in the casing, the compounds of cadmium are to be especially emphasized. The method of the present invention allows the yellow, orange and red zirconium inclusion pigments, known for their brilliance, with CdS and Cd(S,Se) inclusions to be used for the decoration of porcelain which has not yet matured without significant color changes occurring in the final firing, which is a special advantage. Such inclusion pigments are well known and hence the term "inclusion pigment" as used herein is intended to encompass all such substances.

Among the auxiliary agents acting in a color-stabilizing manner which are selected from the series of the cerium(III) and cerium(IV) compounds, in particular cerium dioxide and cerium(III)carbonate can be cited by way of example, with cerium dioxide being preferred. From the series of zinc compounds acting in a color-stabilizing manner, in addition to zinc oxide, the zinc-containing glass frits with a ZnO content of at least 10% by weight, preferably 20 to 70% by weight, are especially suitable. Such zinc silicates are well known. Zinc compounds which form zinc ions in the presence of a melting glaze are, for example, those compounds which form zinc oxide during the heating up to the temperature of the porcelain firing, that is zinc carbonate, basic zinc carbonate, zinc acetate and zinc sulfate; however, zinc compounds such as zinc phosphate, zinc borate and zinc silicates can also be used.

What amount of one or more color-stabilizing auxiliary agents is used in accordance with the present invention depends, on the one hand, on the desired stabilizing effect and, on the other hand, on the thermal stress to be expected, and finally on the type of use. A person skilled in the art will be able to determine the optimum amount in preliminary tests. In the case of the use of the color-stabilizing auxiliary agent or agents in porcelain glaze, it must not be forgotten that even the physical properties of the glaze (e.g., the viscosity) are influenced by the auxiliary agents of the present invention.

Greater flexibility regarding the selection of substances and the amount of color-stabilizing auxiliary agents is achieved in that these auxiliary agents are not located, or are located only to a slight extent, in the glaze layer, but rather preferably in the decorative layer. This can be achieved in that a pigment composition is used to apply the decorative layer which composition contains, aside from the inclusion pigments, at least one of the color-stabilizing auxiliary agents of the invention, preferably in an amount of 5 to 50% by weight calculated as ZnO or $CeO_2$ or $Ce_2O_3$ and relative to the amount of inclusion pigments. Such a pigment composition can be readily produced by means of intensive mixing and/or common grinding of the inclusion pigments with the color-stabilizing auxiliary agent or agents in the presence or absence of a liquid or pasty medium, usually a so-called printing medium. In particular, media like those customary for applying decorations onto ceramic objects are used as media. This involves for example water, aqueous organic liquids, liquids containing organic polymers and waxy substances. In addition, the pigment composition can also contain further auxiliary processing agents, viscosity regulators and substances for the accelerated drying or hardening of the decorative layer; all of which are known in the art.

Preferred pigment compositions in accordance with the invention preferably contain, in addition to the inclusion pigment, a zirconium inclusion pigment containing a cadmium sulfide or cadmium sulfoselenide, ZnO in an amount of 20 to 40% by weight or a zinc-containing glass frit with a ZnO content of 30 to 50% by weight in an amount of 30 to 50% by weight relative in each instance to the inclusion pigment contained in the composition. A further preferred pigment composition contains 10 to 30% by weight cerium dioxide relative to the inclusion pigment contained in the composition. To the extent that the pigment composition additionally contains a liquid or pasty medium, the person skilled in the art will use it in such an amount that he obtains the processing viscosity suitable for his selected application method for applying the decorative layer. The application of the decorative layer can take place manually or by machine by means of known direct or indirect pressure methods.

The manner of applying a glaze on a formed porcelain object, which is unfired or prefired in a biscuit firing, is known to the person skilled in the art. Likewise, a person skilled in the art will adjust the selection of the glaze components and the composition of the glaze to the composition of the porcelain and to the firing conditions required therefor.

It has become possible by virtue of the method of the present invention, as well as by the pigment composition of the present invention, to use brilliant yellow to red inclusion pigments for the decoration of porcelain which has not yet been glost-fired. This renders superfluous a subsequent decoration and a decoration firing necessary for it. In as far as unfired porcelain is decorated in accordance with the present invention, and glazed with an appropriately selected porcelain glaze, the entire system can be fired in a single firing, which, in addition, eliminates the biscuit firing.

The following examples and reference examples are intended to clarify the invention further:

REFERENCE EXAMPLE 1

Commercial zirconium-cadmium sulfide yellow was made into a paste in water and the paste applied by brush onto an unfired porcelain plate. After the decoration had dried, the plate was glazed using a conventional glaze softening at approximately 1300° C. The decorated and glazed porcelain plate was fired in a gas-heated tunnel kiln for a total of 6 hours (including heating-up time) during which the temperature was between 1350° and 1400° C. for one hour and the kiln atmosphere was reducing during this time.

After the firing the decoration exhibits a grey to bright yellowish olive color instead of a brilliant yellow color.

REFERENCE EXAMPLE 2

After being made into a paste, zirconium-cadmium-sulfoselenide red is applied according to reference example 1 onto an unfired porcelain plate and glazed and then supplied to a porcelain firing.

Instead of the expected brilliant red color of the decoration, it is now brown.

EXAMPLE 1

Zirconium-cadmium sulfide yellow is mixed with 20% by weight zinc oxide and made into a paste together with water. After application of the paste, glazing and porcelain firing under the conditions of reference example 1, a decoration which is considerably less discolored in comparison to reference example 1 is obtained—the color is yellow with only a slight tinge of grey.

EXAMPLE 2

Example 1 is repeated; however, the amount of zinc oxide is increased to 40% by weight relative to the inclusion pigment. After the porcelain firing the color of the decoration is pure yellow, brilliant yellow in thick layers.

EXAMPLE 3

Zirconium-cadmium-sulfoselenide red is mixed with 20% by weight zinc oxide and made into a paste with water. After the application of the decorative layer, glazing and porcelain firing according to reference example 1, the decoration exhibits a red color with only a slight tinge of brown.

EXAMPLE 4

Example 3 was repeated using the double amount of zinc oxide, that is, 40% by weight. The color of the decoration is distinctly red, the color intensity is slightly less due to the dilution.

EXAMPLE 5

Zirconium-Cd(S, Se) red is mixed with 30% by weight basic zinc carbonate and then made into a paste with water. After application of the decoration, glazing and porcelain firing according to reference example 1, the decoration exhibits a red color.

EXAMPLE 6

Zirconium-Cd(S, Se) red is mixed with 50% by weight of a glass frit based on an alkali zinc silicate glass with a ZnO content of 31% by weight and then made into a paste with water. After application of the decoration, glazing and porcelain firing according to reference example 1, the decoration exhibits a salmon red color.

The decorative color of the corresponding pigment composition with only 30% by weight of the glass frit (instead of 50% by weight) is less brilliant.

EXAMPLE 7

10, 20 and 30% by weight cerium dioxide relative to the inclusion pigment were mixed with zirconium-CdS yellow, zirconium-Cd(S, Se) orange or zirconium-Cd(S, Se) red in each instance as color-stabilizing auxiliary agent. The application of the decoration, glaze and the porcelain firing took place as in reference example 1. In all instances, respective yellow, orange and red decorations were obtained and the decorations with only 20% by weight $CeO_2$ were already luminously brilliant.

EXAMPLE 8

Example 7 was repeated but instead of cerium dioxide, cerium(III) carbonate in the form of $Ce_2(CO_3)_3 \cdot 5H_2O$ was used. The decorations with 30% by weight cerium(III) carbonate were more brilliant after the firing than those with 20% by weight.

Further variations and modifications of the foregoing will be apparent to those skilled in the art and such variations and modifications are attended to be encompassed by the claims that are appended hereto.

German Priority Application P 42 16 175.4, filed on May 15, 1992, is relied on and incorporated by reference.

What is claimed:

1. A method for the production of a decoration on a porcelain surface which decoration is essentially color-stable in a porcelain firing, said method comprising the steps of (a) applying a decorative layer onto said porcelain surface which is unfired or pre-fired in a biscuit firing and (b) applying a layer of glaze onto said porcelain and (c) firing said porcelain at a temperature in a range of 1300° to 1500° C., wherein said decorative layer contains a pigment composition containing a inclusion pigment selected from the group consisting of crystals of colored heavy-metal sulfides, selenides and sulfoselenides enclosed in a transparent oxidic or silicate casing and at least one color-stabilizing auxiliary agent being present in said decorative layer or present in said layer of glaze or being present in both of said decorative layer and said layer of glaze, wherein said agent is selected from the group consisting of cerium(III) compounds, cerium (IV) compounds, zinc oxide and zinc compounds forming zinc ions during the porcelain firing, and said agent is present in an amount of at least 2% by weight calculated as ZnO or $Ce_2O_3$ or $CeO_2$ and relative to the amount of inorganic solids in the decorative layer or layer of glaze.

2. The method according to claim 1, wherein said color-stabilizing auxiliary agent is present in an amount of 5 to 50% by weight calculated as ZnO or $CeO_2$ or $Ce_2O_3$ and relative to the amount of said inclusion pigments.

3. The method according to claim 2, wherein said pigment composition additionally contains a liquid or pasty printing medium.

4. The method according to one of claim 1, wherein said inclusion pigment is a zirconium inclusion pigment containing cadmium sulfide or cadmium sulfoselenide.

5. The method according to claim 1, wherein said pigment composition contains 20 to 40% by weight zinc oxide relative to the amount of said inclusion pigment.

6. The method according to claim 1, wherein said pigment composition contains 30 to 50% by weight of a glass frit with a ZnO content of 30 to 50% by weight relative to the amount of said inclusion pigment.

7. The method according to claim 1, wherein said pigment composition contains 10 to 30% by weight cerium dioxide relative to the amount of said inclusion pigment.

8. A pigment composition for the production of a decoration which is essentially color-stable in a porcelain firing, comprising an inclusion pigment based on crystals enclosed in a transparent oxidic or silicate casing and containing a colored heavy-metal sulfide, selenide or sulfoselenide or mixture thereof and at least one color-stabilizing auxiliary agent selected from the group consisting of cerium(III) compounds and cerium (IV) compounds, said agent being present in an amount of at least 2% by weight calculated as $Ce_2O_3$ or $CeO_2$ and relative to the amount of said inclusion pigments.

9. The pigment composition according to claim 8, wherein said sulfide is CdS.

10. The pigment composition according to claim 8, wherein said sulfoselenide is Cd(S, Se).

11. The pigment composition according to claim 8, wherein said inclusion pigment is a zirconium inclusion pigment containing cadmium sulfide or cadmium sulfoselenide.

12. The pigment composition according to claim 8, further comprising a liquid or pasty printing medium.

13. The pigment composition according to claim 8, wherein said transparent oxidic or silicate casing is selected from the group consisting of $ZrO_2$, $SnO_2$, $Al_2O_3$ and $ZrSiO_4$.

14. The pigment composition according to claim 8, wherein said transparent oxidic or silicate casing is zirconium silicate or tin dioxide.

15. The pigment composition according to claim 8, wherein said auxiliary agent is zinc-containing glass frit with a ZnO content of $\geq 10\%$ by weight.

16. The pigment composition according to claim 8, wherein said auxiliary agent is zinc-containing glass frit with a ZnO content of 20 to 70% by weight.

17. The pigment composition according to claim 8, wherein said auxiliary agent is cerium oxide or cerium-(III) carbonate.

18. The pigment composition according to claim 8, wherein said auxiliary agent is zinc carbonate, zinc acetate, zinc sulfate, zinc phosphate, zinc borate or zinc silicate.

19. The pigment composition according to claim 8, wherein said auxiliary agent is $CeO_2$ present in an amount of 5 to 50% by weight relative to the amount of said inclusion pigment.

20. The pigment composition according to claim 8, wherein said auxiliary agent is ZnO present in an amount of 20 to 40% by weight relative to the amount of said inclusion pigment.

21. The pigment composition according to claim 8, wherein said auxiliary agent is a zinc-containing glass frit with a ZnO content of 30 to 50% by weight present in an amount of 30 to 50% by weight relative to the amount of said inclusion pigment.

22. The pigment composition according to claim 8, wherein said auxiliary agent is cerium dioxide present in an amount of 10 to 30% by weight relative to the amount of said inclusion pigment.

23. A pigment composition for the production of a decoration which is essentially color-stable in a porcelain firing, comprising an inclusion pigment based on crystals enclosed in a transparent oxidic or silicate casing and containing a colored heavy-metal sulfide, selenide or sulfoselenide or mixture thereof and at least one color-stabilizing auxiliary agent selected from the group consisting of zinc oxide and zinc compounds forming zinc ions during porcelain firing, said agent being present in an amount of at least 2% by weight calculated as ZnO and relative to the amount of said inclusion pigments.

24. The pigment composition according to claim 23, wherein said sulfide is CdS.

25. The pigment composition according to claim 23, wherein said sulfoselenide is Cd(S, Se).

26. The pigment composition according to claim 23, wherein said inclusion pigment is a zirconium inclusion pigment containing cadmium sulfide or cadmium sulfoselenide.

27. The pigment composition according to claim 23, further comprising a liquid or pasty printing medium.

28. The pigment composition according to claim 23, wherein said transparent oxidic or silicate casing is selected from the group consisting of $ZrO_2$, $SnO_2$, $Al_2O_3$ and $ZrSiO_4$.

29. The pigment composition according to claim 23, wherein said transparent oxidic or silicate casing is zirconium silicate or tin dioxide.

30. The pigment composition according to claim 23, wherein said auxiliary agent is ZnO present in an amount of 5 to 50% by weight relative to the amount of said inclusion pigment.

31. A method for the production of a decoration on a porcelain surface which decoration is essentially color-stable in a porcelain firing, said method consisting essentially of the steps of (a) applying a decorative layer onto said porcelain surface which is unfired or pre-fired in a biscuit firing and (b) applying a layer of glaze onto said porcelain and (c) firing said porcelain at a temperature in a range of 1300° to 1500° C., wherein said decorative layer contains a pigment composition containing a inclusion pigment selected from the group consisting of crystals of colored heavy-metal sulfides, selenides and sulfoselenides enclosed in a transparent oxidic or silicate casing and at least one color-stabilizing auxiliary agent being present in said decorative layer, wherein said agent is selected from the group consisting of cerium(III) compounds, cerium (IV) compounds, zinc oxide and zinc compounds forming zinc ions during the porcelain firing, and said agent is present in an amount of at least 2% by weight calculated as ZnO or $Ce_2O_3$ or $CeO_2$ and relative to the amount of inorganic solids in the decorative layer or layer of glaze.

* * * * *